United States Patent Office 2,907,751
Patented Oct. 6, 1959

2,907,751
ALKENYLPHENOL-ALDEHYDE RESINS

Roger M. Christenson and Hilary E. Holste, Whitefish Bay, Wis., assignors to Pittsburgh Plate Glass Company, Allegheny County, Pa.

No Drawing. Application May 3, 1954
Serial No. 427,386

6 Claims. (Cl. 260—53)

This invention relates to a method for improving the properties of resins obtained by the condensation of an alkenylphenol with an aldehyde, and pertains more particularly to a process whereby the alkenylphenol-aldehyde resin is heated with an alcohol in an acidic or essentially neutral medium.

In copending applications, Serial Nos. 390,088, and 390,089, both filed November 3, 1953, now Patents Nos. 2,843,565 and 2,843,566, it is disclosed that alkenylphenols, such as mono-, di- and trialkenylphenols condense with aldehydes, particularly formaldehyde, in the presence of either an acidic or alkaline condensation catalyst to yield resinous products which possess many outstanding properties. For example, the resins thus obtained produce films which are fast drying and curing, and very light colored. Also, the resins possess outstanding solvent and alkali resistance and electrical properties, and are compatible with varnishes and drying oils and other materials utilized in the preparation of coating compositions, such as vinyl resins, polyvinylacetal resins, epoxide resins, alkyd resins and the like. Blends of alkenylphenol-aldehyde condensation products with vinyl resins and with polyvinylacetal resins are extremely useful as sanitary liners for containers used in the packaging of foods, beverages, synthetic liquid detergents and similar materials.

However, resins prepared by the condensation of phenols with aldehydes normally tend to be relatively unstable materials. This is particularly true of resins prepared from phenol itself, or alkyl substituted phenols, and to a much lesser degree is true also of alkenylphenol-aldehyde resins. Also, the presence of even small quantities of unreacted phenols in the resin lowers to a considerable extent the compatibility of the resin with other materials such as vinyl resins, polyvinylacetal resins and the like.

It has now been discovered that the disadvantages mentioned in the foregoing paragraph can be substantially overcome, and the useful properties of alkenylphenol-aldehyde resins even further enhanced by a relatively simple procedure wherein the resin is heated with a hydroxyl containing compound in an acidic or essentially neutral medium. In this process some of the alcohol actually reacts with the methylol hydroxyl groups of the resin. The resulting resin, ordinarily less viscous than the resin before the hydroxy compound is reacted therewith, is considerably more stable than conventional phenol-aldehyde resins, is more compatible with other materials such as vinyl resins, alkyd resins and the like than is the untreated resin, and films prepared therefrom tend to fabricate into severe angles or curvatures more readily than the untreated resin films. Moreover, the reaction with an hydroxy compound enhances the stability, compatibility and fabrication properties of the resin without affecting the excellent solvent and alkali resistance or the other outstanding properties possessed by the alkenylphenol-aldehyde resins. This is believed to be a rather unexpected result, inasmuch as it has heretofore been thought that phenolic resins containing one or more side chains on the phenolic nucleus possessed relatively poor solvent resistance as a result of the presence of the side chain. It has also been believed heretofore that the properties of condensation products of aldehydes and phenols having fewer than three reactive positions on the phenolic nucleus could not be improved by heating with an alcohol in an acidic or essentially neutral medium. However, the alkenylphenol or alkenylphenol mixtures which are utilized in the preparation of the resinous condensation products reacted with an alcohol in accordance with the present invention possess on an average only two reactive positions on the phenolic nucleus. It is also believed surprising that the viscosity of the treated resin is actually lower than that of the untreated material since the literature indicates that reaction of an alcohol with a phenol-aldehyde resin in which the phenol contains no unsaturated side chain substituent causes bodying of the resin, that is, the viscosity of the resin actually increases when the resin is heated with an alcohol.

The alkenylphenol-aldehyde resins which are treated with an hydroxyl compound in accordance with the present invention are ordinarily obtained by condensing a mixture of alkenylphenols with an aldehyde in the presence of an alkaline catalyst, although acidic catalysts may also be used. The mixture of alkenylphenols which is condensed with an aldehyde may vary widely in composition. Ordinarily, the predominate component of the mixture is one or more monoalkenylphenols, (including ortho- and para-monoalkenylphenols), the monoalkenyl component constituting about 55 to 85 percent by weight of the total mixture. The balance of the mixture (about 15 to 45 percent) is composed primarily of di- and trialkenylphenols, although other phenolic materials, including polyphenols such as alkane di- and triphenols may also be present, depending upon the method by which the alkenylphenol mixture is prepared.

Mixtures of alkenylphenols of the type described in the foregoing paragraph are readily obtained by the methods described in copending applications, Serial No. 300,359, filed July 22, 1952, and Serial Nos. 337,226, 337,227, 337,228 and 337,229, all filed February 16, 1953, the latter two of which are now abandoned. The methods described in these copending applications involve the reaction of conjugated dienes with phenolic compounds in the presence of certain catalysts such as the Friedel-Crafts compounds. For example, the reaction product obtained by the reaction of butadiene-1,3 with phenol in the presence of an aqueous sulfuric acid catalyst is generally composed of less than about 15 percent unreacted phenol, less than about 5 percent of ethers, 55 to 70 percent of mono-butenylphenols, and 15 to 50 percent of the higher boiling phenols including di- and tributenylphenols and polyphenols. Ordinarily, the unreacted phenol and ethers will be removed from the reaction mixture by distillation before the condensation reaction with an aldehyde is carried out; however, this is not a critical expedient and the condensation reaction takes place readily even though the unreacted phenols and ethers are not removed. Mixtures containing smaller quantities of monoalkenylphenols and larger quantities of the higher boiling phenols, for example, about 50 percent monoalkenylphenols and 30 to 50 percent of higher boiling phenols and the balance polyphenols and ethers, may also be employed with good results, as may mixtures containing no monoalkenylphenols. Also, the mixture may be composed entirely of ortho- and para-monoalkenylphenols, and, in fact, excellent resins are obtained when such a mixture is employed. Mixtures of alkenylphenols with minor quantities of other phenols containing no unsaturated side chain, such as phenol, butylphenol, amylphenol and the like may also be used.

It is to be understood that mixtures of alkenylphenols can also be obtained by other methods known to the art in addition to the reaction of conjugated dienes with phenolic compounds, and it is intended that the present invention include the use of any mixture of alkenylphenols regardless of the method whereby it is obtained.

As illustrative of the alkenyl substituted phenolic compounds which are condensed with an aldehyde to form the novel resins of the present invention there are set forth below the products of the reaction of butadiene-1,3 and phenol:

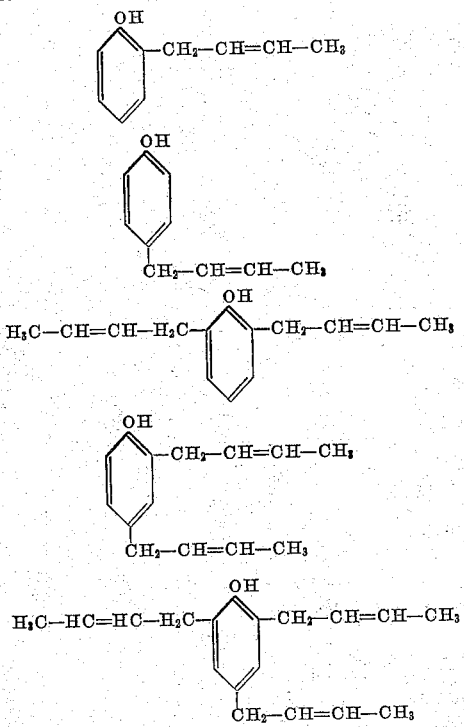

A mixture of the above alkenylphenols forms excellent resins when condensed with an aldehyde in the presence of an acidic or alkaline catalyst.

In general, the alkenylphenolic compounds which are condensed with aldehydes possess the structure $Rn$-Ar-$(OH)_{n_1}$ wherein Ar is an aromatic radical, R is alkenyl, cyclopentenyl, haloalkenyl, halocyclopentenyl, alkoxyalkenyl or alkoxycyclopentenyl, and $n$ and $n_1$ are whole numbers, ordinarily from 1 to 3. Preferably the sum of $n$ and $n_1$ is from 2 to 4. The alkenyl compounds of the above structure are all readily obtained by the reaction of phenolic compounds with conjugated dienes in accordance with the methods described in the copending applications referred to hereinabove.

While it is preferred that a mixture of alkenylphenols be utilized in preparing resins since such a mixture is economically obtained by the methods described above, and does not require the relatively costly separation of the individual components of the mixture, it is to be understood that if desired the monoalkenylphenols or the di- and trialkenylphenols can be separated from the mixture and utilized in the preparation of useful resins. The preferred alkenylphenol-aldehyde resins are those prepared from mixtures of the butenylphenols, including ortho- and para-2-butenylphenols, di-2-butenylphenols, and tri-2-butenylphenols.

In preparing the resins, any aldehyde may be utilized. However, aldehydes containing only atoms of carbon, hydrogen and oxygen, and particularly formaldehyde, are greatly preferred. In place of formaldehyde, a material which decomposes upon heating to yield formaldehyde, for example, paraformaldehyde or trioxymethylene, may be utilized in the condensation reaction. An aqueous 37 percent formaldehyde solution is generally used very successfully.

Best results are obtained when an alkaline catalyst is employed in carrying out the condensation of a mixture of alkenylphenols or a single alkenylphenol with an aldehyde. Suitable alkaline materials include sodium hydroxide, potassium hydroxide, barium hydroxide, sodium carbonate, potassium carbonate, ammonia, hexamethylenetetramine and the like. Acidic catalysts such as hydrochloric acid, phosphoric acid, acetic acid, and oxalic acid may also be used.

The quantity of catalyst utilized may be varied considerably. For example, it is generally desirable that about one-fourth equivalent of catalyst be present for each equivalent of alkenylphenolic compounds. Based upon the total weight of the reactants, about 0.5 percent to about 5.0 percent of the catalyst is used. Larger amounts of the catalyst may be utilized if desired.

Alternatively, the catalyst may be dispensed with entirely, although higher reaction temperatures may then be required with attendant increase in darkening of the resinous product.

The molar ratio of aldehyde to alkenylphenols utilized in carrying out the condensation reaction may be varied widely, and depends somewhat on whether an acidic or alkaline catalyst is used. When an alkaline catalyst is used, best results are obtained when about 2.0 moles of the aldehyde are utilized for each mole of the alkenylphenolic compounds in the reaction mixture. However, the ratio may be as low or lower than 0.5 to 1.0 or as high or higher than 5.0 to 1.0. When the ratio is much below the preferred 1.5 to 2.0 ratio the resinous product tends to be hard. When the ratio is substantially above 2.0 to 1.0 good results are obtained but there is no economical advantage in utilizing such large excess of the aldehyde.

On the other hand, when an acid catalyst is used, most useful resins are obtained when less than a mole of the aldehyde is employed for each mole of the alkenylphenolic component in the reaction mixture, with about 0.8 mole of aldehyde to 1.0 mole of the mixture of alkenylphenolic compounds being preferred. However, the ratio may be as low or lower than 0.5 to 1.0 or as high or higher than 5.0 to 1.0. When the ratio is substantially above 1.5 to 1.0 no advantage is obtained, and in fact, gels, rather than hard resins, may be formed. Consequently, the use of such an uneconomical excess is not particularly desirable.

The alkali catalyzed condensation reaction is best carried out by first admixing the alkenylphenols and the catalyst under an inert atmosphere such as nitrogen, and/or in the presence of sodium hydrosulfite, utilizing sufficient cooling to maintain the resulting reaction mixture at about room temperature (25° C.). When solution is obtained the aldehyde is added at a moderate rate and cooling is applied as needed to keep the temperature below about 35° C. Care should be taken to keep traces of air out of the reactor at all times during the condensation. Stirring is continued for about 48 hours at room temperature.

At the end of this time the reaction mixture is carefully acidified to a pH of about 5.0 with a mineral acid such as hydrochloric acid, phosphoric acid or sulfuric acid, or a carboxylic acid such as acetic acid or propionic acid. Two layers are formed, a water layer and an alkenylphenolic resin layer. The water layer is drawn off and the water insoluble layer of resin is water washed 4 or 5 times. At this point it is advantageous to add about 0.1 percent by weight of a material such as an aminotetracarboxylic acid which forms a complex with any iron in the reaction mixture. The presence of uncomplexed iron is likely to cause darkening of the product. The resin is then dehydrated by vacuum stripping at steam temperatures and at a pressure of about 20 mm. to 55 mm. Alternatively, the water can be removed by adding a solvent and then carrying out an azeotropic distillation.

A preferred method from the standpoint of simplicity is to acidify, separate the resin layer, and dry the resin layer by blowing with an inert gas at 220° F. to 230° F. The resin is thinned with a suitable solvent and the salt removed by filtration.

While the above described method for carrying out the condensation is preferred, particularly when the alkenylphenol mixture is a mixture of butenylphenols, other methods of carrying out the condensation, for example, simply by admixing the reactants and catalyst and allowing the mixture to stand at room temperature for about 48 hours, or by maintaining the reaction mixture at temperatures as high as 100° C. or higher, may also be utilized. In the event that higher temperatures are utilized the condensation will, of course, require less time than when the condensation is carried out at room temperature.

While the resins obtained by the alkaline condensation of a mixture of alkenylphenols with an aldehyde such as formaldehyde are generally recovered as viscous liquids, it is also possible to obtain hard resinous materials by condensing equimolar quantities of alkenylphenols and aldehyde in the presence of an alkaline catalyst and then acidifying the reaction mixture to a pH of about 2.0. The resulting hard materials are especially useful as varnish resins.

The acid catalyzed condensation reaction is best carried out by first admixing the formaldehyde, or formaldehyde producing substance, with the mixture of alkenylphenols and the acidic catalyst. The resulting mixture is then heated to a temperature of about 50° C. to 150° C. for about 2 to 3 hours, after which the water present in the reaction mixture is stripped off by distillation at reduced pressure, leaving the desired resin as a hard, grindable material. The reaction can, however, also be carried out simply by admixing the reactants and the acidic catalyst and allowing the mixture to stand at room temperature for 48 hours, or by maintaining the reaction mixture at temperatures even higher than 150° C.

In accordance with the present invention a resinous condensation product prepared in the foregoing manner is heated with an hydroxyl compound in an acidic or essentially neutral medium. The nature of the hydroxyl compound utilized is not critical and may be varied considerably. Preferably, however, it is an alcohol of the structure ROH, wherein R is an alkyl radical such as methyl, ethyl, propyl, butyl, amyl, or 2-ethyl hexyl. Butyl alcohol and 2-ethyl-hexanol-1 are especially useful for this purpose. Other alcohols which may be used include castor oil, butane diol-1,4, soya alcohols, allyl alcohol, ethylene glycol, alkyd resins containing free hydroxyl groups, and others. The amount of alcohol utilized in the process may also be varied widely, although in general it is desired that it be utilized in an amount about equal to the quantity of resin being treated. Larger or smaller quantities may be employed if desired.

It has been found that best results are obtained when the reaction is carried to a stage such that the quantity of alcohol which actually reacts with the resin is from about 10 to 30 percent by weight. The degree of reaction obtained can readily be calculated by determining the solids content of the resin before and after treatment, with the difference indicating the amount of alcohol which has reacted with the resin.

As indicated hereinabove, the heating is carried out in an acidic or essentially neutral medium, that is, at a pH of 7.0 or below. Preferably, the pH during the heating process is maintained at about 3.0 to 6.0. The amount of alcohol which reacts with the resin can be accurately controlled by adjustment of the pH, the reaction rate increasing as the pH of the medium is decreased. The desired pH can readily be obtained by initially acidifying the untreated resin with a mineral acid such as sulfuric acid, hydrochloric acid, or phosphoric acid, or an organic carboxylic acid such as acetic acid, propionic acid, oxalic acid, or maleic acid.

The process is readily carried out simply by admixing the acidified resinous condensation product with the desired quantity of hydroxyl compound and then heating at reflux temperature for a period of about 3 to 4 hours, after which the resin is recovered by filtering or other conventional means of separation. This simple procedure is preferred; however, generally equivalent results are obtained if the hydroxyl compound is added to the mixture of the alkenylphenol and aldehyde during the condensation reaction, although it is more difficult to control the degree of reaction by this latter procedure. The reaction also takes place at temperatures lower than those required to obtain reflux, although the rate of reaction is likely to be slower at the lower temperatures.

The following examples illustrate in detail the preparation of resinous condensation products from alkenylphenols and aldehydes, and the reaction of the resulting resins with an alcohol in accordance with the present invention. The examples are not, however, intended to limit the invention, inasmuch as there are, of course, numerous possible variations and modifications.

*Example I*

One hundred forty-eight parts of a mixture of monobutenylphenols (o- and p-monobutenylphenols) and 10 parts of sodium hydroxide in 100 parts of water were mixed under a nitrogen atmosphere with sufficient cooling to keep the temperature below about 35° C. When a homogeneous solution was obtained, 163 parts of 37 percent formalin, methanol free, containing 60 grams (2 moles) of solid formaldehyde were added at a moderate rate and cooling was continued to keep the temperature below about 35° C. Stirring was continued for about 48 hours at room temperature. At the end of this time the reaction mixture was acidified to a pH of 5.0 with a mixture of concentrated hydrochloric acid and water (50 percent acid and 50 percent water) and the resulting water insoluble layer of the resin was washed 4 times with lukewarm water. The resin was then dehydrated by vacuum stripping at steam temperatures under 20 mm. to 50 mm. pressure. The yield based on the quantity of alkenylphenols utilized was 120 percent, the viscosity at 25° C. was W to Z (Gardner), and the resulting resin was completely miscible with ethanol, butanol, toluene, and xylene.

*Example II*

Example I was repeated using each of the following formaldehyde:butenylphenol ratios: 0.8:1, 1:1, 2:1, and 4:1. In each run a resin was obtained which gave light colored, fast curing films and which was compatible with drying oils, varnishes, alkyd resins and a great many other film forming materials.

*Example III*

Several different aldehydes were condensed with mixed butenylphenols, including mono-, di- and tributenylphenols. The aldehyde utilized, the catalyst concentration, the mole ratio of aldehyde to butenylphenol, the reaction time and temperature (degrees centigrade) are set forth in the following table:

| Aldehyde | Catalyst | Ratio of Aldehyde to Mixed Butenylphenols | Reaction Time and Temperature (Degrees, C.) |
|---|---|---|---|
| Furfural | 3% Sodium Hydroxide | 1:1 | 25° C.—48 hrs. |
| Crotonaldehyde | 4% Sodium Hydroxide | 4:1 | 25° C.—48 hrs. |
| Acetaldehyde | 4% Sodium Hydroxide | 4:1 | 25° C.—48 hrs. |

Example IV

The following materials were charged into a glass lined reactor:

24.6 pounds mixed butenylphenols (monobutenylphenols, di- and tributenylphenols)
27.0 pounds formalin solution (37 percent formaldehyde)
1.7 pounds sodium hydroxide
1.7 pounds water
0.12 pound sodium hydrosulfite The resulting mixture was cooled to 75° F. to 80° F. and the reaction mixture agitated for 5 hours after which it was allowed to stand for 43 hours. The reaction mixture was then acidified to a pH of 5.0 with 68 percent sulfuric acid, and allowed to stand until a water layer settled out. The water layer was then drawn off and discarded. To the wet resin (36.25 pounds) 0.04 pound of an aminotetracarboxylic acid known commercially as Sequestrene AA was added. The resin was then heated to 220° F. and stripped with an inert gas (nitrogen) until a Gardner viscosity of W at 75 percent solids in n-butanol was reached. The resin was then thinned with 10 pounds of n-butanol and filtered at 110° F. The following is the analysis of the final material:

| | |
|---|---|
| Weight per gallon | 8.45 pounds. |
| Solids | 66.2 percent at 110° C. |
| Viscosity | Q to R (Gardner). |

Eighty-five parts of the resin thus prepared was blended with 15 parts by weight of polyvinylbutyral and roller coated on tin plate and cured at 350° F. for 20 minutes. The resulting film was of a thickness such that the film weighed 16 mgm./4 square inches, and was light colored, mar-resistant and insoluble in acetone.

Example V

One hundred sixty-two grams (1 mole) of a mixture of pentenylphenols was placed in a glass lined reactor fitted with a condenser. Sixty-four and eight-tenths grams of formalin solution (0.8 mole formaldehyde) were then added to the pentenylphenols at a temperature of 24° C. Five cc. of concentrated hydrochloric acid were added slowly through the condenser, the temperature rising to 28° C. during the addition of the acid. The reaction mixture was then heated at 95° C. for 2 hours, during which time it was continuously agitated. The reaction mixture was then distilled at reduced pressures until all of the water was removed, the percent solids at that point being 76 percent. A 100 gram sample of the resin was heated and blown with an inert gas at 175° C. The resulting resin was hard and brittle. A second sample was baked at 175° C. for 1½ hours. After cooling, the sample was very hard. The total weight of resin obtained from the condensation reaction was 152.0 grams.

Example VI

Example V was repeated except that 1 mole of a mixture of cyclopentenylphenols was substituted for the mixture of pentenylphenols utilized in Example V. One hundred fifty-nine and two-tenths grams of a gum-like resin having 95.6 percent of solids were obtained. On baking at 175° C. for 1½ hours a very hard, grindable resin was obtained.

Example VII

Fifteen hundred fifty-eight and six-tenths grams of butenylphenol-formaldehyde resin prepared according to the method of Example IV was acidified with phosphoric acid to a pH of 6.0. A second charge of 1382 grams of a butenylphenolformaldehyde resin also prepared according to the method of Example IV, was acidified with phosphoric acid to a pH of 3.4. Butyl alcohol was present in each of these charges in an amount of 25 percent by weight.

Both charges were then refluxed for 2¾ hours with the pot temperature reaching 132° C. at the end of this time. By determining the solids content of each resin before and after the reaction, it was determined that in the first charge, the butyl alcohol had reacted to an extent of 12.1 percent of the solids and in the second charge 17.7 percent, indicating that the reaction rate increases as the pH of the refluxing medium is lowered.

The resins thus prepared were found to be extremely compatible with polyvinylbutyral, with vinyl resins and with an oleoresinous varnish. A sample of the untreated resin was substantially incompatible with the same oleoresinous varnish.

Example VIII

Five hundred grams of a butenylphenol-formaldehyde resin prepared according to the method of Example IV (except that the wet resin was used after separation of the water layer and without bodying) and 150 grams of butyl alcohol were placed in a glass reactor and refluxed azeotropically at a temperature below about 120° C. for approximately 13 hours. The original resin before the addition of the butyl alcohol had a percent solids of 74.4, after 6 hours of reflux a percent solids of 57.2 and after 13 hours of reflux a percent solids of 58.2. The percent butylation was 14. The resulting resin was clear and extremely light colored, and when 85 parts thereof were blended with 15 parts of polyvinylbutyral a composition was obtained which produced films of outstanding alkali and solvent resistance. The composition was useful as a coating composition for containers used in the packaging of foods, beverages, synthetic liquid detergents and the like.

Examples IX to XV

In the following exampels, a number of different alcohols were heated with butenylphenol-formaldehyde resins (prepared according to the method of Example IV and distilled to remove any solvent present). In each example, 100 grams of butenylphenol-formaldehyde resin and 0.2 gram of maleic anhydride were admixed with the alcohol. In Examples IX through XIV 100 grams of toluene were added and the mixture refluxed azeotropically for 3 hours (in Example XI for 2 hours); in Example XV, the toluene was omitted and the mixture heated to reflux. The specific alcohol utilized and the quantity thereof, the yield, the percent solids, the Gardner color and viscosity are set forth in the accompanying table:

| Example | Charge | | | Yield (Parts) | Percent Solids | Color (Gardner) | Viscosity (Gardner) |
|---|---|---|---|---|---|---|---|
| | Parts Toluene | Alcohol | Parts Alcohol | | | | |
| IX | 100 | Butyl alcohol | 25 | 201.1 | 50.8 | 7 | A– |
| X | 100 | Castor oil alcohol | 25 | 226.0 | 49.1 | 6 | E–F |
| XI | 100 | Butane diol-1, 4 | 25 | 227.6 | 46.2 | 6 | A– |
| XII | 100 | Soya alcohol | 25 | 200.2 | 54.9 | 6 | A– |
| XIII | 100 | Lauryl alcohol | 25 | 226.4 | 46.5 | 6 | A– |
| XIV | 100 | 2-ethylhexanol-1 | 25 | 225.7 | 46.6 | 6 | A– |
| XV | | Allyl alcohol | 100 | 202.4 | 48.5 | 7–8 | A– |

The resinous composition obtained in the above examples was in each instance more compatible with other resinous materials such as vinyl resins, alkyd resins and the like than the butenylphenol-formaldehyde resin before reaction with the alcohol. The final resinous products were also more stable than a butenyl-phenol-aldehyde resin which had not been reacted with an alcohol.

Example XVI

Twenty two hundred seventy seven grams of a butenyl-phenol-formaldehyde resin (prepared according to the method of Example IV), 732 grams of 2-ethyl hexanol-1 and 400 grams of toluene were admixed and the pH of the mixture lowered to 4.5 by adding phosphoric acid. The resulting mixture was then heated and the water removed using a toluene filled separator. After the greater part of the water was removed, the temperature rose steadily to 120° F. More toluene was added in order to keep the temperature at about 120° F. The batch was then refluxed for 3 hours at 120° F. The toluene was then distilled off until a flask temperature of 140° C. was reached. The resulting resin was treated with 0.5 percent triethanolamine, cooled slightly and filtered under a vacuum. Twenty nine hundred ninety four grams of a resin having a solids content of 71 percent, a viscosity of G–H (Gardner), a weight per gallon of 8.39, and a Gardner color of 6–9 was obtained. It was determined that the 2-ethyl hexanol-1 had reacted with the resin in an amount of 27.4 percent based on the charged solids.

The resulting resin was blended with polyvinylbutyral, the polyvinylbutyral being present in an amount of about 10 percent by weight. The composition was baked for 10 minutes at 390° F. on tin plate to give a film having a thickness such that the film weighed 10 mgm./4 square inches. The film fabricated well and was resistant to the action of chemicals.

A second sample of the resinous product was blended with a hydroxyl modified copolymer of vinyl acetate and vinyl chloride, the butenylphenol-formaldehyde resin being present in an amount of 90 percent by weight, to give a composition which was baked for 10 minutes at 390° F. on tin plate. The film fabricated well and was extremely resistant to the action of chemicals.

Example XVII

Samples of the resinous condensation product of Example VIII were blended with an oleoresinous varnish, the butenyl-phenol-formaldehyde resin being varied in an amount from 15 to 50 percent by weight of the total composition. The butenyl-phenol-formaldehyde resin product was compatible with the oleo-resinous varnish over the entire weight percent range and the resulting compositions gave compatible films which fabricated well and which did not show any signs of fracture when immersed for 5 minutes in a copper sulfate solution. Also, the resinous product when pigmented with materials such as zinc oxide or titanium oxide gave good resistance at processing temperatures in the presence of meat and other food products.

A butenylphenol-formaldehyde resin, similar in all respects to the resinous product of Example VIII except that it was not reacted with butyl alcohol, was found to be compatible with the same oleoresinous varnish only in amounts below 25 percent by weight. It is apparent, therefore, that the compatibility of alkenylphenol-aldehyde resins with varnishes is greatly increased when the resin is first reacted with an hydroxyl compound.

Example XVIII

An alkyd resin was prepared by admixing 235.5 grams of crystallized cottonseed fatty acids, 184 grams of phthalic anhydride, and 118 grams of glycerol, and heating the resultant mixture in xylene under an azeotropic reflux at 180° C. The temperature was then lowered to 150° C. and 500 grams of butenylphenol-formaldehyde resin (70 percent solids) and 0.6 gram of ethylenediamine tetraacetic acid were added. The temperature was then raised to 200° C. until a Gardner viscosity of X was obtained, and the resulting product was thinned with xylene.

With no added modifiers the resin prepared according to the above method was stripped out from a butanol solution onto iron plate to give a film having a thickness of approximately 12 mgm./4 square inches of area. The baked film (10 minutes at 390° F.) was clear and level with good flow out properties, and fabricated into a container closure cap very readily, giving no signs of fracture in a 5 minute immersion in copper sulfate solution. The film did not blush when immersed in water for 1 hour at 250° F.

Example XIX

In order to determine the stability of alkenylphenol-aldehyde resins which had been reacted with a hydroxyl compound in accordance with the present invention as compared to the untreated alkenylphenol-aldehyde resins, a number of preparations of both types of resins were carried out and the resulting resinous products were maintained at a temperature of 150° F. at varying pH values and observed daily to determine how long the sample remained clear and bright. The material was classed as being no longer stable when it became hazy and water began to condense therefrom. The pH at which the resin was maintained and the number of days required for the resin to become unstable are recorded below:

|  | pH | Days at 150° F. Before Becoming Hazy |
|---|---|---|
| Untreated butenylphenolformaldehyde resin | 6.8 | 21 |
|  | 7.0 | 21 |
|  | 7.5 | 21 |
| Butenylphenol-formaldehyde resin reacted with butanol | 6.9 | Over 50 |
|  | 7.2 | Over 50 |
|  | 7.3 | Over 50 |

Moreover, when other alkenylphenols are substituted for the butenylphenols and pentenylphenols in the above examples, good results are obtained. Similarly, when other methods of carrying out the reaction of the resin with the alcohol are employed, compatibility and stability of the resulting materials are considerably improved.

It is apparent from the foregoing description that the process of the invention provides an economical and useful method for improving stability and compatibility characteristics of resins prepared by the condensation of alkenylphenols with aldehydes. It will also be apparent, therefore, that various embodiments of the invention, in addition to those specifically disclosed, may be provided without departing from the spirit and scope of the invention as defined in the appended claims.

We claim:

1. A method of improving the stability, compatibility, and fabrication properties of an alkaline catalyzed resinous condensation product of formaldehyde and a mixture of butenylphenols consisting of monobutenylphenols, dibutenylphenols, and tributenylphenols said resinous condensation product being characterized by having methylol radicals attached to carbon atoms of the phenolic rings, which comprises heating a mixture of said resinous condensation product and an aliphatic monohydric alcohol containing from 1 to about 8 carbon atoms, while maintaining the pH of the reaction mixture below about 7.0 for a period such that about 10 percent to 30 percent of the hydroxyl groups of said methylol radicals of the resin are reacted with said alcohol.

2. The method of claim 1 wherein the reaction mixture is heated to reflux temperature.

3. The method of claim 2 wherein the pH is maintained within the range of about 3.0 to 6.0.

4. The method of claim 3 wherein the alcohol is butanol.

5. The method of claim 3 wherein the alcohol is 2-ethylhexanol-1.

6. A resinous product prepared according to the method of claim 1.

References Cited in the file of this patent

UNITED STATES PATENTS

| | | |
|---|---|---|
| 2,006,043 | Dykstra | June 25, 1935 |
| 2,175,393 | Hentrich et al. | Oct. 10, 1939 |
| 2,242,250 | Honel et al. | May 20, 1941 |
| 2,587,578 | Jones | Mar. 4, 1952 |
| 2,657,185 | Young | Oct. 27, 1953 |

FOREIGN PATENTS

| | | |
|---|---|---|
| 155,968 | Austria | Apr. 25, 1939 |
| 182,886 | Great Britain | July 6, 1922 |
| 511,511 | Great Britain | Aug. 21, 1939 |
| 999,701 | France | Oct. 3, 1951 |